(12) United States Patent
Krieger et al.

(10) Patent No.: US 6,377,029 B1
(45) Date of Patent: Apr. 23, 2002

(54) CURRENT REGULATED MOBILE BATTERY BOOSTER

(75) Inventors: Michael Krieger, Miami Beach, FL (US); Jack Robert Colton, Pennsauken, NJ (US); Henry Shum, Kowloon (HK)

(73) Assignee: Vector Manufacturing, Ltd., Fort Lauderdale, FL (US)

( * ) Notice: Subject to any disclaimer, the term of this patent is extended or adjusted under 35 U.S.C. 154(b) by 0 days.

(21) Appl. No.: 09/558,151

(22) Filed: Apr. 26, 2000

(51) Int. Cl.[7] .................................................. H02J 7/04
(52) U.S. Cl. ........................................ 320/139; 320/104
(58) Field of Search ................................ 320/139, 103, 320/104, 137, 134

(56) References Cited

U.S. PATENT DOCUMENTS

| | | | |
|---|---|---|---|
| 4,540,929 A | * | 9/1985 | Binkley .................... 320/104 |
| 5,352,966 A | * | 10/1994 | Irons ........................ 320/103 |
| 5,637,978 A | * | 6/1997 | Kellett et al. ............. 320/104 |
| 5,793,185 A | * | 8/1998 | Prelec et al. .............. 320/104 |
| 5,883,491 A | | 3/1999 | Silverman .................. 320/104 |
| 5,993,983 A | | 11/1999 | Rozon ........................ 429/156 |

OTHER PUBLICATIONS

Century Mfg. Co. Brochure, "The Safe Choice Rescue Pac", Jan. 1999 (2 pages).

* cited by examiner

Primary Examiner—Peter S. Wong
Assistant Examiner—Lawrence Luk
(74) Attorney, Agent, or Firm—Venable; Robert Kinberg (57) ABSTRACT

A portable, rechargeable device for boost-charging a discharged target battery is equipped with current sensing and regulation circuitry. The device may be used, for example, for boost-charging through a cigarette lighter socket or directly. Such circuitry permits very rapid charging using voltages greater than the nominal voltage of the target battery without blowing a fuse of the cigarette lighter socket or damaging sensitive onboard electronics.

16 Claims, 7 Drawing Sheets

CURRENT REGULATED MOBILE BATTERY BOOSTER

FIELD OF THE INVENTION

The invention lies in the field of mobile battery booster technology, for example, for boosting automobile batteries. In particular, it deals with an apparatus capable of boosting such batteries through a cigarette lighter socket or directly, using a booster clip adapter. The invention may be generalized, however, to apply to any type of battery connection.

BACKGROUND OF THE INVENTION

There exist, in the prior art, through-the-cigarette-lighter-socket boost charge systems; however, such prior art systems are incapable of starting the vehicle if the vehicle's battery charge is below 6V. Six volts is barely enough to operate lights and to enable a clicking sound when the key is turned in the ignition, which is the sound of a starter solenoid trying to engage.

The prior-art techniques are many and varied. Some do not supply more than a nominal 12V DC to boost-charge a discharged battery through the lighter socket, instead relying on the mere difference of potential (between the charger and the battery) to slowly bring the discharged battery to a voltage high enough to operate the vehicle.

Some systems, like that disclosed in U.S. Pat. No. 5,637,978, use an inductive boost circuit powered by a lead-acid 12V battery and an electronically controlled semiconductor switch that grounds and un-grounds an inductor, so that back EMF aids the source voltage, resulting in a significantly higher voltage than the discharged battery, causing a charging current to flow. This technique, however, is slow and requires a large battery package to sustain the relatively inefficient boosting process.

Another technique, exemplified by the system of U.S. Pat. No. 5,883,491, uses boosting voltages significantly higher than the voltage of the target battery, using, for example, a 36V primary battery with an initially relatively low internal resistance, in comparison to that of a discharged vehicle battery. The initial current flow is relatively high but quickly decreases as the target battery's voltage builds up and its internal resistance decreases. Note that as the booster's battery discharges, its internal resistance increases, and heat is produced. After about five minutes of boosting, the user can start the vehicle. Such a booster may not, however, be used if the vehicle's battery is so depleted that it is incapable of illuminating lights or activating a starter solenoid; that is, the voltage level should be in the range of 6–9V for a nominal 12V starting circuit (note that a 9–10V minimum voltage would be needed to actually start the vehicle, as opposed to the 6–9V voltage that is capable of [barely] activating a starter solenoid).

SUMMARY OF THE INVENTION

An object of the invention is to provide a through-the-cigarette-lighter-socket booster system that can rapidly boost-charge a discharged vehicle battery (the battery to be boosted will be referred to as the "target battery" below) without causing the lighter socket fuse (typically, a 15 or 20 amp fuse) to blow.

Another object of the invention is to provide such a booster system that regulates current applied to the target battery so as to prevent damage to onboard electronic systems.

Another object of the invention is to provide such a booster system that is electrically efficient and, thus, able to utilize smaller, lighter batteries.

Yet another object of the invention is to provide such a booster system at a low cost.

The inventive apparatus addresses these and other objects, as well as the shortcomings of the prior-art systems described above. The battery booster system that contains current regulation circuitry so as to adjust for current as the target battery is recharging and the booster's internal battery is discharging. Without such regulation, current surges may occur, which may cause the lighter socket fuse to blow. The booster system has a DC connection which may comprise a cigarette lighter plug for charging the target battery through a cigarette lighter socket and/or battery clips for directly charging the target battery at the terminals thereof.

In one embodiment, the inventive system uses electromechanical relays to switch between two voltage (equivalently, current) levels to control current. In another embodiment, pulse-width modulation-based techniques are used to control the current.

All embodiments are electrically efficient because they employ switching or interrupting techniques to control current, rather than heat-producing linear regulation techniques or inductive boost switching techniques. Furthermore, they are capable of boosting a depleted battery having a lower voltage than depleted battery voltages with which the prior-art through-the-cigarette-lighter-socket booster systems can be used.

BRIEF DESCRIPTION OF THE DRAWINGS

The invention will be better understood in light of the detailed description below, taken in combination with the accompanying drawings, in which.

DETAILED DESCRIPTION OF THE INVENTION

Figure 1:
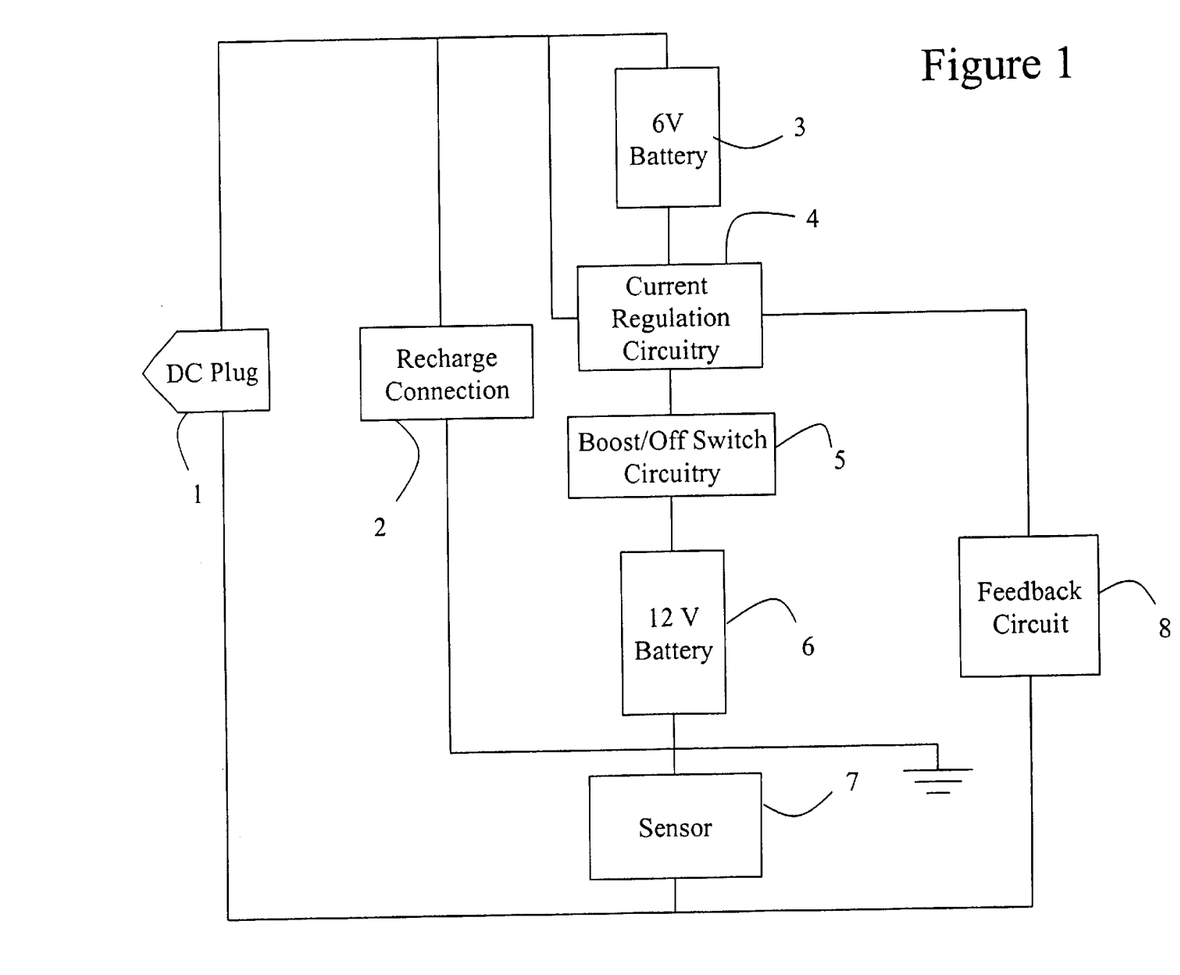
FIG. 1 depicts an overall block diagram of a through-the-cigarette-lighter-socket booster system according to the invention.

A schematic block diagram of a preferred embodiment of the invention is shown in FIG. 1. The inventive system features two power sources, a 6V power source 3 and a 12V power source 6; these power sources comprise rechargeable batteries in a preferred embodiment of the invention. In another preferred embodiment, the rechargeable batteries are of the lead-acid type, which are capable of storing and providing more amp-hours than the types of batteries found in prior art systems. In another preferred embodiment, 12V power source 6 may comprise two 6V power sources connected in series. By using two power sources, 3 and 6, the inventive system is capable of providing 6V power, 12V power, or if the batteries are connected in series, 18V power.

The embodiment of FIG. 1 further includes a DC plug 1, through which the inventive system is electrically connected to a target battery. DC plug 1 includes positive and negative terminals. In a preferred embodiment, this comprises a male connector for insertion in a vehicle's cigarette lighter socket. In a further embodiment, it also includes an adapter for permitting direct connection to the terminals of the target battery, which is useful, for example, if the vehicle does not have a cigarette lighter socket or if the fuse in the vehicle's cigarette lighter socket has blown.

The electrical configuration of the system is determined by current regulation circuitry 4, boost/off switch circuitry 5, sensor 7, and feedback circuit 8; the combination of these elements determine if the system is "on" or "off," and if on, whether or not power sources 3 and 6 are connected in series to produce 18V power or not. Boost/Off switch circuitry permits a user to turn the system "on" or "off." Regulation circuitry 4 switches the series connection between power sources 3 and 6 on and off; i.e., when the two sources are switched to be in series, 18V power is produced across the terminals of DC plug 1, and if not, then 12V power is produced. Regulation circuitry 4 is controlled by means of feedback circuit 8, which receives an input signal from sensor 7. Sensor 7, which, in a preferred embodiment, comprises a sensing impedance, is used to measure the current level, which feedback circuit 8 compares with a reference level so as to determine what voltage level to send to current regulation circuitry 4. Depending on the voltage level received from feedback circuit 8, current regulation circuitry 4 determines whether or not the two power sources 3 and 6 are connected in series or if power is to be derived only from 12V source 6.

Current regulation is used to permit boost-charging through a cigarette lighter socket. Such sockets are generally equipped with a (15A or 20A) fuse. If the current being supplied is permitted to increase above the rated current of the fuse, then the fuse will blow. The circuitry described here prevents this by regulating the current being supplied.

Use of the entire 18V power source (i.e., power sources 3 and 6 in series) would be preferable from the standpoint of speed of charging. Because of the fuse, however, use of such a power source exclusively would result in large sustained current surges, particularly when the target battery voltage is low, resulting in a blown fuse. Such current surges may also damage sensitive onboard electronics. This problem is avoided by use of the circuitry described above. Using sensor 7, the feedback circuit is able to determine when current regulation circuitry 4 should connect DC plug 1 to 18V power or 12V power, depending upon the current level sensed by sensor 7. This permits switching between the two voltage levels, depending upon detected current, so that quick and efficient charging may be effected. Here, speed is provided by the fact that 18V power is used at least part of the time; and efficiency results from the fact that switching between different power levels is used, rather than the heat-producing linear regulation techniques or inductive boost switching techniques used in prior-art systems.

FIG. 1 further shows recharge connection 2. Recharge connection 2 is used to recharge power sources 3 and 6. It may include an AC adapter for recharging using an AC power source, like a wall socket, or it may comprise circuitry that permits recharging using a DC power source, which may be a vehicle cigarette lighter socket. Furthermore, recharge connection 2 may utilize DC plug 1 for recharging purposes. In an embodiment in which DC recharging is implemented, Boost/Off switch circuitry 5 may comprise a three-position switch, whose positions correspond to "On," "Off/AC Recharge," and "DC Recharge."

Figure 2:
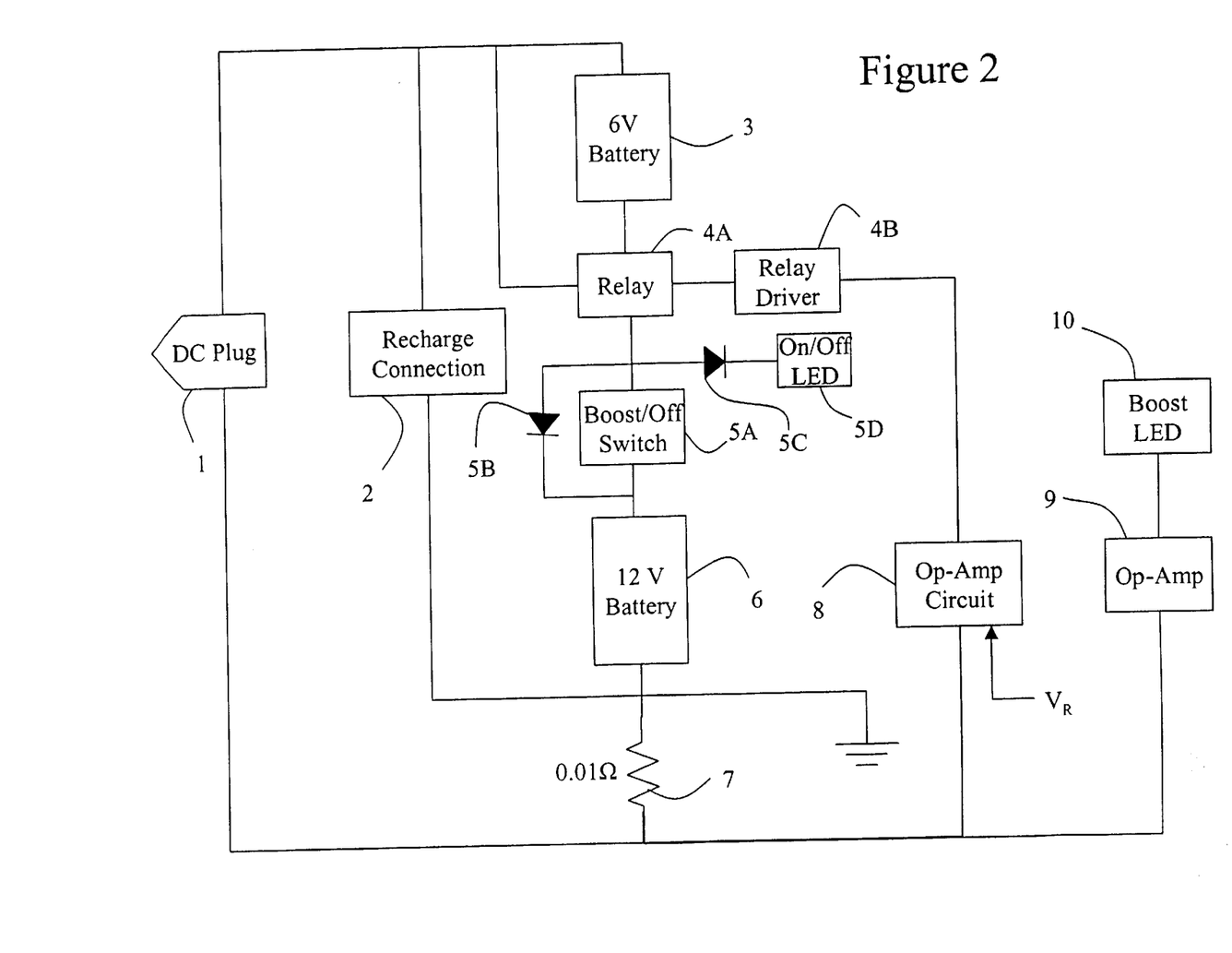
FIG. 2 depicts a block diagram of a first preferred embodiment of the invention.

FIG. 2 depicts a first specific embodiment of the invention. Note that similar parts are numbered identically across the figures. In this embodiment, the current regulation circuitry 4 is embodied as an electromechanical relay 4A and a relay driver 4B to control it. The feedback circuit is shown embodied as an op-amp circuit 8. The sensor is embodied as a sensing resistor 7. The boost/off switch 5 is shown embodied as boost/off switch 5A, diodes 5B and 5C, and on/off light-emitting diode (LED) 5D. Finally, this embodiment adds op-amp 9 and boost LED 10.

The embodiment of FIG. 2 regulates the current supplied to a target battery by switching the system's output to the target battery between 12V and 18V. Sensing resistor 7 is used to determine the amount of current flow; the current passing through sensing resistor 7 gives rise to a voltage that is fed to op-amp circuit 8. Op-amp circuit 8 compares the voltage across sensing resistor 7 to a reference voltage VR. Relay driver 4B then uses the output of op-amp circuit 8 to control the switching of relay 4A. When relay 4A is in one position, the system output is at an 18V level because 12V battery 6 and 6V battery 3 are connected in series; when it is in a second position, 6V battery 3 is bypassed, and the output is at a 12V level, generated by 12V battery 6. The output thus appears as a 6V rectangular wave superimposed on a 12V DC level. Sensing resistor 7, op-amp circuit 8, relay driver 4B and relay 4A are arranged such that when the system is outputting 18V, that is, when 6V battery 3 is switched in by the relay, if the detected current approaches the level at which the cigarette lighter socket's fuse will blow, the relay switches so as to change the output to 12V by bypassing 6V battery 3. The relay is switched back, thus switching in 6V battery 3, giving an 18V output, when the detected current falls below a particular level, reflected by reference voltage $V_R$.

On/off LED 5D, in conjunction with diode 5C, lights to indicate that boost-charging is occurring. Boost LED 10 is arranged with op-amp 9 to flash when a good connection is made through the cigarette lighter socket, indicating the condition of the socket's fuse. When the energy transfer and current drop to a low level, boost LED 10 changes from a flashing condition to a steady condition, which indicates that the target battery is sufficiently charged to, for example, permit the starting of a vehicle in which it is situated.

Figure 3:
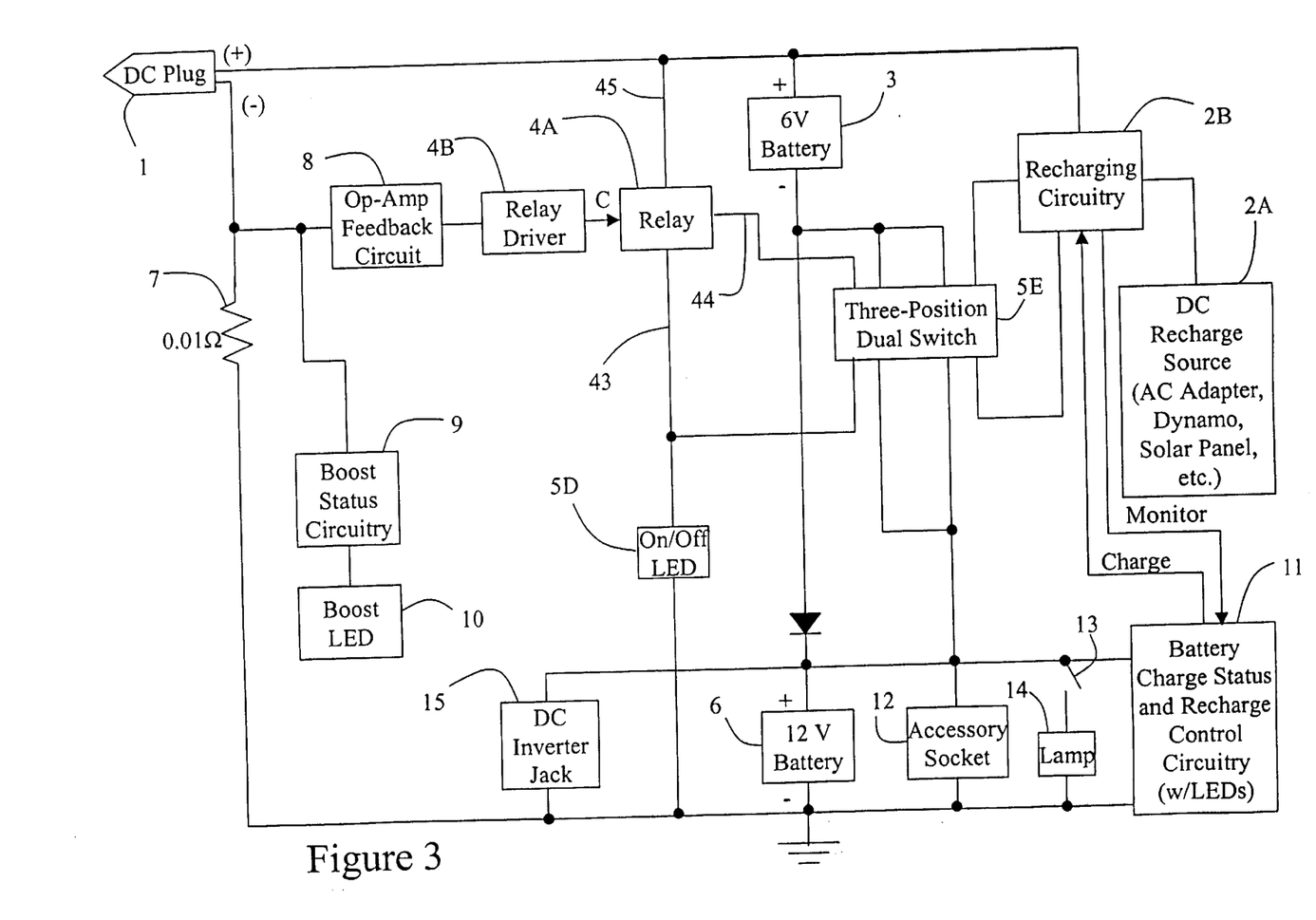
FIG. 3 depicts a block diagram of a second preferred embodiment of the invention.

FIG. 3 depicts another embodiment of the invention, incorporating features in addition to those found in the embodiment of FIG. 2. Specifically, the embodiment of FIG. 3 adds a capability of recharging through a cigarette lighter socket and means for monitoring the charge status of the system. Additionally, other features, which may be optional, are shown in FIG. 3.

Figure 3A:
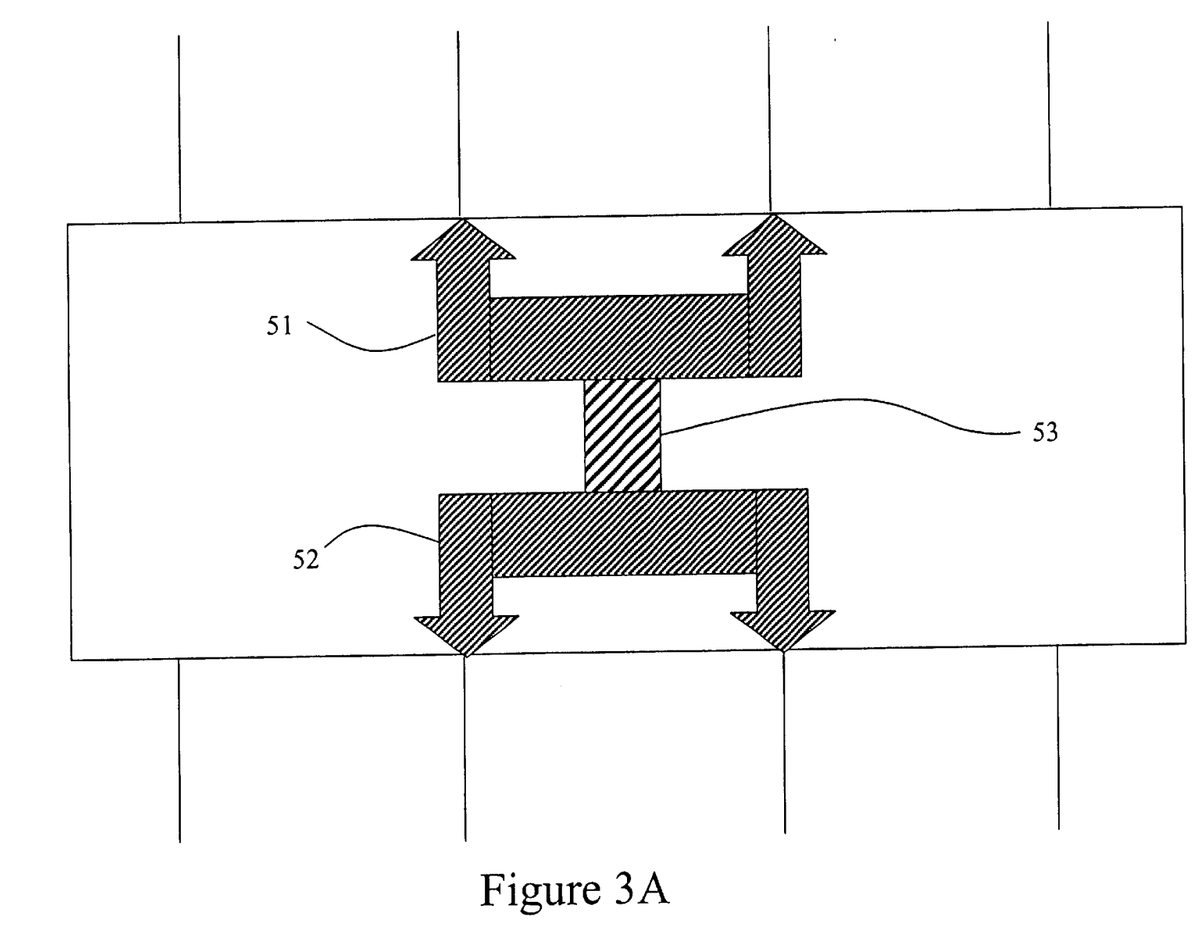
FIG. 3A depicts a schematic diagram of a three-position dual switch used in embodiments of the invention.

In FIG. 2, the system is capable of recharging via recharge connection 2; in FIG. 3, this is composed of a DC recharge source 2A, which may, for example, be an AC adapter, a hand-cranked dynamo, or a solar panel, and recharging circuitry 2B, which provides for appropriate connections and for proper regulation of the recharging process. In a preferred embodiment, recharging circuitry 2B includes current regulation circuitry that regulates the current flow from DC recharge source 2A; such circuitry is well-known in the art. In a preferred embodiment that permits recharging using either DC recharge source 2A or recharging through DC plug 1, switching circuitry 5 (of FIG. 1) comprises a three-position dual switch 5E, by which is meant a device in which there are two three-position switches that are commonly switched (i.e., they are in the same position at the same time); an embodiment of switch 5E is shown in FIG. 3A. As shown in FIGS. 3 and 3A, switch 5E includes eight connections, depicted as four along one side and four along the other side. As shown in FIG. 3A, switch 5E contains two switching elements, 51 and 52, which connect adjacent connections on each side of the switch. The switching elements are connected to each other by a non-conducting connector element 53, which provides that the two sides of switch 5E are electrically isolated from each other. Hence, when switch 5E is in the left position, the left two top connections are connected to each other and the left two bottom connections are connected to each other; when switch 5E is in the center position (shown), the middle two connections on top are connected and the middle two connections on the bottom are connected; and similarly for the right position. In the embodiment of the invention shown in FIG. 3, the three positions of switch 5E correspond to "BOOST" (left), "OFF/AC Recharge" (center), and "DC Recharge" (right).

Switch 5E is used to provide the proper paths for recharging given the different recharging modes discussed above. The different recharging modes have different electrical characteristics. For example, a preferred AC adapter (i.e., an AC to DC converter) constitutes a 20V DC source producing 600 mA of current, while a vehicle battery may provide 12V DC at significantly higher amperage. As such, these different sources require different connections for recharging batteries 3 and 6, these connections being implemented via the combination of switch 5E and recharging circuitry 2B. In the case of a 20V source, batteries 3 and 6 may be recharged in series (because 20V >18V ). On the other hand, the 12V vehicle battery can not be used to recharge an 18V battery, so 6V battery 3 and 12V battery 6 are connected to the DC plug 1 so as to be recharged in parallel. Furthermore, while the 12V battery 6 may have a current rating compatible with that of the 12V source supplying DC plug 1, the 6V battery 3 generally does not; hence, recharging circuitry 2B, in a preferred embodiment, includes current regulating circuitry for such recharging of 6V battery 3.

Specifically, in the DC recharging mode, switch 5E is in the right position, which has the result of connecting the negative terminal of 6V battery 3 with current regulating circuitry within recharging circuitry 2B. In the same case, simultaneously, the positive terminal of 12V battery 6 is connected to the 12V input via recharging circuitry 2B. The diode between 6V battery 3 and 12V battery 6 will be reverse-biased, preventing charging in series.

In the case where switch 5E is in the center, "OFF/AC Recharge" position, the negative terminal of 6V battery 3 and the positive terminal of 12V battery 6 are not connected to recharging circuitry 2B. As a result, the 20V DC current from DC recharge source 2A (assuming the use of the preferred AC adapter discussed above) passes through recharging circuitry 2B, which may include (current) regulation circuitry, and then to 6V battery 3. The diode is now forward-biased, so the current may continue to flow to 12V battery 6, thus, charging both batteries in series.

In the embodiment of FIG. 3, the left position of switch 5E enables the BOOST operation. In this mode, the negative side of 6V battery 3 is connected to relay 4A (on the top side), and the positive side of the 12V battery 6 is connected to relay 4A (on the bottom side). This is more precisely illustrated in FIG. 3B.

Figure 3B:
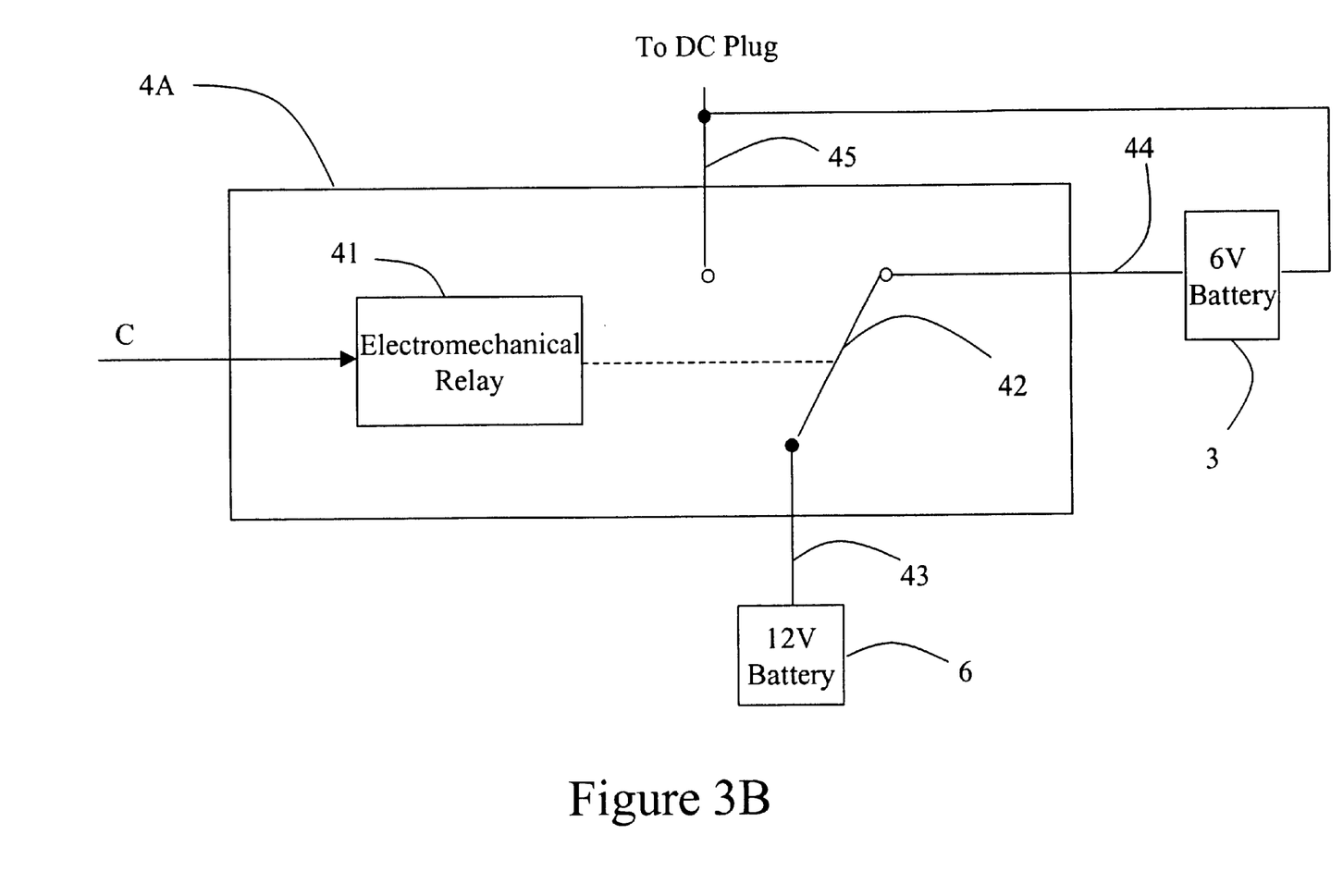
FIG. 3B depicts a schematic diagram of a relay and its connections, used in embodiments of the invention.

FIG. 3B shows the component parts of relay 4A. An electromechanical relay 41 is controlled by signal C, which, as shown in FIG. 3, is generated by relay driver 4B. Electromechanical relay 41 determines which position switch 42 is placed in. Lead 43 is connected to the positive terminal of 12V battery 6 via switch 5E, while lead 44 is connected to the negative terminal of 6V battery 3 via switch 5E. Lead 45 is connected to the positive lead of DC plug 1. In the left position, as shown in FIG. 3B, switch 42 connects the positive terminal of 12V battery 6 to the positive lead of DC plug 1 for 12V operation. In the right position, switch 42 connects the positive terminal of 12V battery 6 to the negative terminal of 6V battery 3, thus connecting the two batteries in series. This series connection of batteries 3 and 6 is connected to the positive lead of DC plug 1 via the positive terminal of 6V battery 3, as shown in FIG. 3.

The embodiment of FIG. 3 also includes battery charge status and recharge control circuitry 11. This element contains circuitry that measures the degree to which the system is charged and displays the results via an array of LEDs. The battery charge status portion may be enabled in two ways: (1) the user may activate it manually at any time, using a switch, button or the like; and (2) it is automatically activated by a control signal, denoted "Monitor," when recharging is occurring. Circuitry 11 also includes circuitry that controls the recharging circuitry 2B. In particular, a control signal, denoted "Charge," is generated by circuitry 11 for controlling the recharging operation, particular via DC recharge source 2A. The Charge signal is indicative of the degree to which the system is charged and is used to enable or disable the recharging via circuitry in recharging circuitry 2B.

Battery charge status and recharge control circuitry 11 may optionally be equipped with an audible alarm that is triggered when the system voltage goes below a certain point.

Figure 3C:
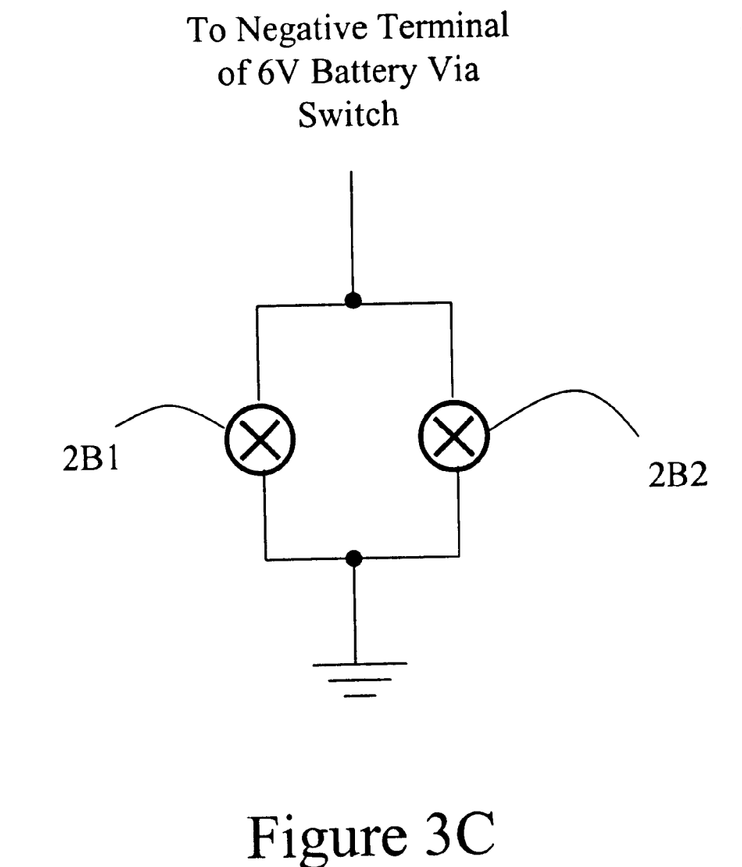
FIG. 3C depicts a regulation arrangement used in preferred embodiments of the invention.

In the embodiment in which DC charging through the DC plug is facilitated, recharging circuitry 2B, in a preferred embodiment of the invention, may include a circuit of the type shown in FIG. 3C. The circuit shown in FIG. 3C depicts twin 12V lamps 2B1 and 2B2 connected (via switch 5E) to the negative terminal of 6V battery 3. These lamps provide a load acting to limit the current through 6V battery 3.

The embodiment shown in FIG. 3 also may include a number of optional features. Shown are 12V accessory socket 12, lamp 14 (controlled by switch 13), and DC inverter jack 15; however, optional features are not limited strictly to those shown. Lamp 14 may be embodied, for example, as a work light or as a spotlight, which may be manually switched on using switch 13. In an alternative embodiment, switch 13 and lamp 14 may be connected across 6V battery 3 instead of across 12V battery 6. DC inverter jack 15 facilitates the connection of a DC inverter (i.e., a DC-to-AC converter) for powering AC appliances; alternatively, such a DC inverter may be built in as part of the invention.

Figure 4:
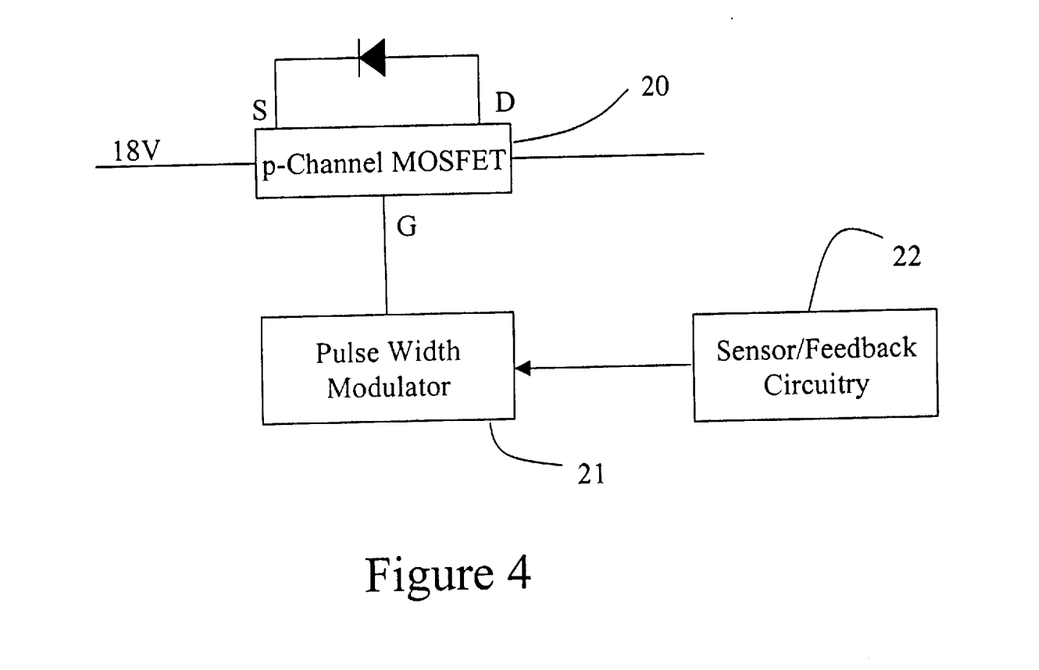
FIG. 4 depicts a block diagram of a third preferred embodiment of the invention.

FIG. 4 shows an alternative embodiment of the current regulation circuitry of the invention. In the previous embodiments, current regulation during boost-charging is performed by alternating between providing 12V DC and 18V DC, depending upon feedback from a sensor circuit. In this embodiment, current regulation during boost-charging is performed, instead, by controlling the time during which 18V DC is supplied. In this embodiment, p-channel MOSFET 20 is configured as a switch, allowing or preventing the passing through of 18V DC. Whether the 18V DC power is permitted to pass through MOSFET 20 is determined by a gate signal G generated by pulse width modulator (PWM) 21. PWM 21 determines gate signal G based upon feedback from a sensor circuit; as in the previous embodiments, the sensor/feedback circuitry 22 may be embodied as a sensing resistor and an op-amp feedback circuit.

Figure 4A:
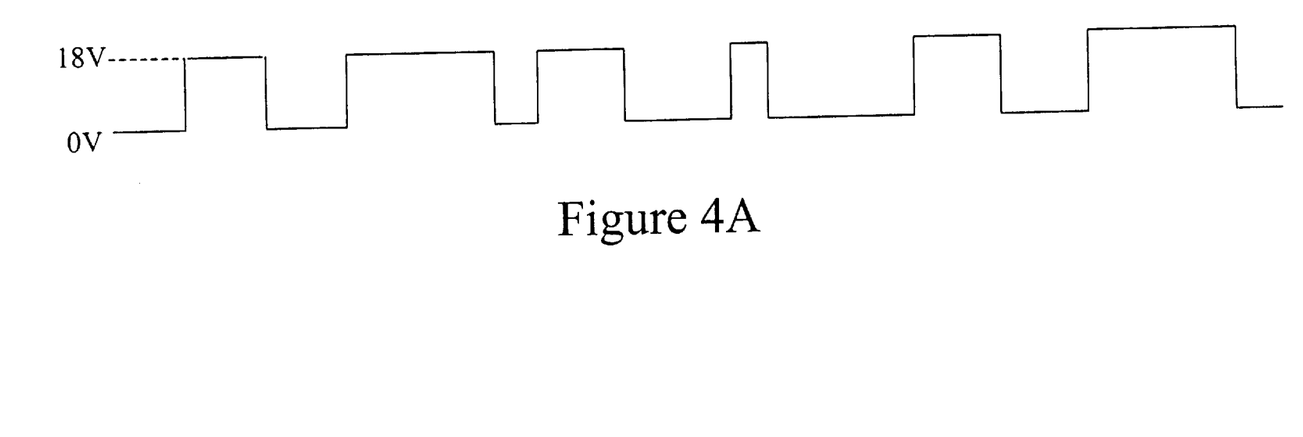
FIG. 4A depicts a gating signal generated in the embodiment depicted in FIG. 4.

The idea behind the embodiment of FIG. 4 is to maintain current at a steady value, for example, 14 amps, that will not cause the cigarette lighter socket fuse to blow. This is done by sensing the amount of current flowing, via circuitry 22. Based on the results from circuitry 22, PWM 21 generates gate signal G as a square wave signal, resulting in a square wave signal at the drain D of MOSFET 20. FIG. 4A depicts an example of such a square wave signal. PWM 21, via gate signal G, serves to regulate the time per given time interval during which MOSFET 20 is "ON" (i.e., permits the 18V signal to pass through). This controls the current flow by turning MOSFET 20 "ON" (permitting the 18V signal to pass through) when the sensed current is below, say, 14 amps, and by turning MOSFET 20 "OFF" (preventing the 18V signal from passing through) when the sensed current exceeds 14 amps.

In a preferred embodiment of the invention, the circuitry of FIG. 4 is arranged to as to provide a "slow start" feature. In this case, current is regulated such that when charging is initiated, the current initially ramps up to the maximum current, instead of the maximum current being immediately provided. Such capability is well-known in PWM integrated circuits.

As in the other embodiments, the 18V source is comprised of 6V and 12V sources (in a preferred embodiment, lead-acid-type batteries) connected in series, and the 12V source may comprise two 6V sources connected in series. Various optional devices (e.g., light, 12V DC power socket, etc.) that were discussed above may also be implemented in this embodiment.

Although the invention has been described as having a DC plug for through-the-cigarette-lighter-socket boost-charging, the invention is not limited to only such a DC plug. On the contrary, the DC plug may be replaced by any suitable DC connection for providing boost-charging. For example, the DC connection may comprise battery clips, like those used with booster cables, to permit direct boost-charging of a target battery.

The above embodiments permit boost-charging of target batteries that have discharged to a much greater degree than in the case of prior-art devices. The present invention has been tested on target batteries having charges as low as 1.5V, which is well below the voltage required to activate a starter solenoid, or even to illuminate lights, and has successfully boosted them. Furthermore, the present invention does so at a high rate of speed. A target battery having a charge of only 1.5V was rendered capable of starting an automobile in only five minutes.

The invention has been described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. An apparatus for rapidly boost-charging a target battery, comprising:
   a DC connection through which the boost-charging is performed;
   a first DC voltage source having a first voltage output coupled to the DC connection;
   a second DC voltage source having a second voltage output coupled to the DC connection, said second voltage output being greater than said first voltage output, and the sum of said first and second voltage outputs being greater than a nominal voltage output of said target battery;
   a sensing arrangement coupled to the DC connection for determining an amount of current flowing to the target battery during boost-charging; and
   a current regulation circuit, coupled to said first and second DC voltage sources and to the DC connection, for regulating the amount of current flowing through the DC connection to the target battery during boost-charging based on the output of said sensing arrangement.

2. The apparatus of claim 1, wherein said current regulation circuit comprises:
   a relay driver circuit receiving input from said sensing arrangement;
   a switch coupled to a negative terminal of said first DC voltage source and to a positive terminal of said second DC voltage source; and
   an electromechanical relay, coupled to the output of said relay driver and controlling said switch, wherein in one position, the switch connects said first and second DC voltage sources in series for boost-charging the target battery, and wherein in a second position, the switch connects only said second DC voltage source for charging the target battery.

3. The apparatus of claim 1, wherein said current regulation circuit comprises:
   a MOSFET switching circuit, configured to permit or prevent current flow to the target battery in response to a gating signal;
   a pulse width modulation (PWM) circuit receiving input from said sensing arrangement and providing said gating signal to said MOSFET switching circuit, the PWM circuit providing a gating signal that controls the MOSFET switching circuit to permit current flow to the target battery when the current flow sensed by the sensing arrangement is at or below a threshold value and preventing current flow to the target battery when said current flow sensed by the sensing arrangement is above said threshold value.

4. The apparatus of claim 3, wherein said PWM circuit is arranged so as to provide for ramping up of current flow to the target battery.

5. The apparatus of claim 1, wherein each of said first and second DC voltage sources comprises a rechargeable battery.

6. The apparatus of claim 5, wherein each rechargeable battery comprises a lead-acid-type rechargeable battery.

7. The apparatus of claim 5, wherein said second DC voltage source comprises two rechargeable batteries connected in series.

8. The apparatus of claim 5, wherein said first and second DC voltage sources are rechargeable through said DC plug.

9. The apparatus of claim 5, further comprising:
   recharging circuitry coupled to facilitate recharging of said first and second DC voltage sources; and
   at least one of an AC-to-DC converter, a solar panel, and a dynamo, coupled to said recharging circuitry and acting as a DC voltage source for recharging said first and second DC voltage sources.

10. The apparatus of claim 9, wherein said f first and second d DC voltage sources are rechargeable through said DC connection, and wherein said recharging circuitry includes:

two lamps connected in parallel between a negative terminal of said first DC voltage source and ground, said two lamps providing current regulation during recharging of said first DC voltage source through said DC connection.

11. The apparatus of claim 1, further comprising at least one of the following: a DC voltage inverter jack, a lamp, and an accessory socket.

12. The apparatus of claim 11, wherein said apparatus includes said DC voltage inverter jack and further comprises a DC voltage inverter, connectable to said DC voltage inverter jack, for providing AC power.

13. The apparatus of claim 1, further comprising a built-in DC voltage inverter for providing AC power.

14. The apparatus of claim 1, wherein said DC connection comprises a DC plug suitable for insertion in a cigarette lighter socket.

15. The apparatus of claim 14, further comprising:

an adapter attachable to said DC plug, said adapter providing clamps to attach to terminals of a target battery and permitting direct boosting of said target battery, without use of a cigarette lighter socket.

16. The apparatus of claim 1, wherein said DC connection comprises battery clips by which the apparatus may be connected directly to a target battery for boost-charging.

* * * * *